United States Patent [19]
Bauman

[11] Patent Number: 5,833,383
[45] Date of Patent: Nov. 10, 1998

[54] BALL SOCKET CONNECTOR

[75] Inventor: Walter Douglas Bauman, Myrtle Beach, S.C.

[73] Assignee: AVM, Inc., Marion, S.C.

[21] Appl. No.: 899,185

[22] Filed: Jul. 23, 1997

[51] Int. Cl.$^6$ .................................................. F16C 11/06
[52] U.S. Cl. ........................ 403/122; 403/141; 403/142
[58] Field of Search .................... 403/122, 141, 403/142, 143, 135, 132, 76, 77, 315

[56] References Cited

U.S. PATENT DOCUMENTS

| | | | |
|---|---|---|---|
| 4,084,913 | 4/1978 | Schenk | 403/141 |
| 4,200,405 | 4/1980 | Bauer | 403/142 |
| 4,225,261 | 9/1980 | Marx | 403/122 |
| 4,311,405 | 1/1982 | Hawley | 403/142 |
| 4,499,785 | 2/1985 | Bennett et al. | 403/141 X |
| 4,527,925 | 7/1985 | Bauer et al. | 403/143 |
| 4,595,310 | 6/1986 | Ausprung | 403/141 X |
| 5,626,433 | 5/1997 | Iwamoto | 403/122 X |

FOREIGN PATENT DOCUMENTS

| | | | |
|---|---|---|---|
| 2712118 | 10/1977 | Germany | 403/141 |
| 237887 | 8/1926 | United Kingdom | 403/143 |

*Primary Examiner*—Harry C. Kim
*Attorney, Agent, or Firm*—McAndrews, Held, & Malloy Ltd.

[57] ABSTRACT

A ball socket connector particularly adapted for connecting a gas spring shaft with a vehicle so that the gas spring may be used to hold open the vehicle's truck lid, deck lid, hood, lift glass, hatch door (in hatch type vehicles) or the rear door or gate (in minivan or sports utility type vehicles). A manually slidable plate, which is mounted on and slidable with respect to the connector body, retains the ball on a ball stud in an internal cavity in a connector body. The ball stud projects from the internal cavity through an elongated open slot in the connector body so as to permit the ball socket connector to provide four degrees of freedom of motion between the gas spring and vehicle.

19 Claims, 2 Drawing Sheets

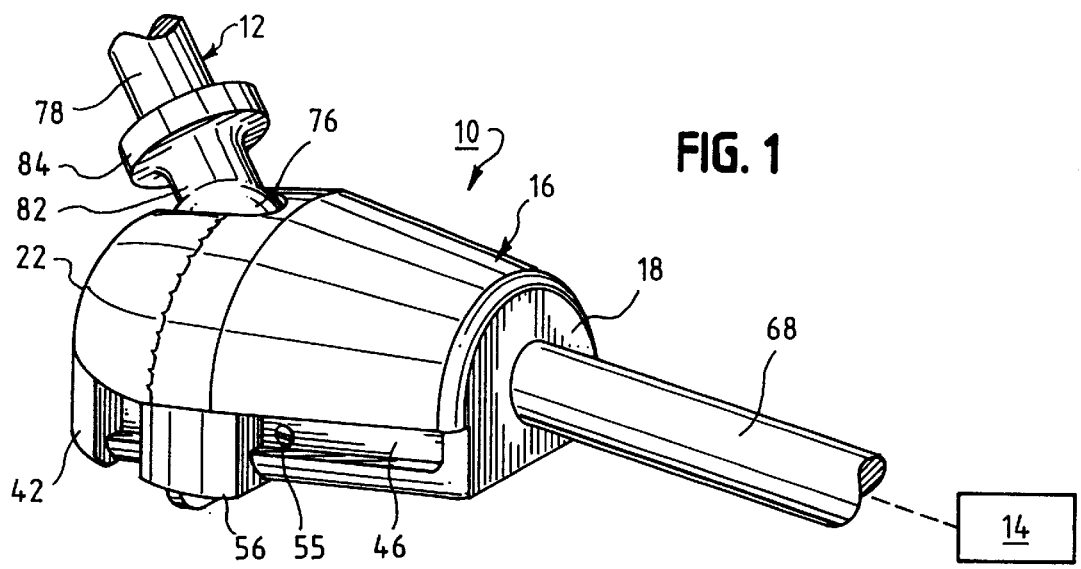
FIG. 1
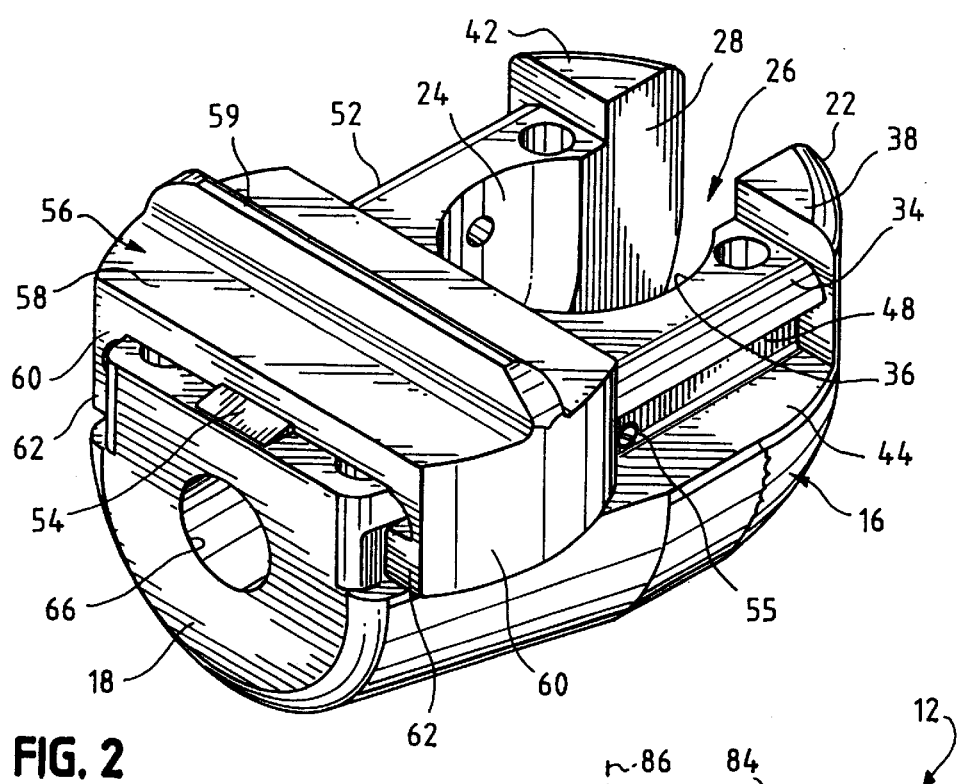
FIG. 2
FIG. 3

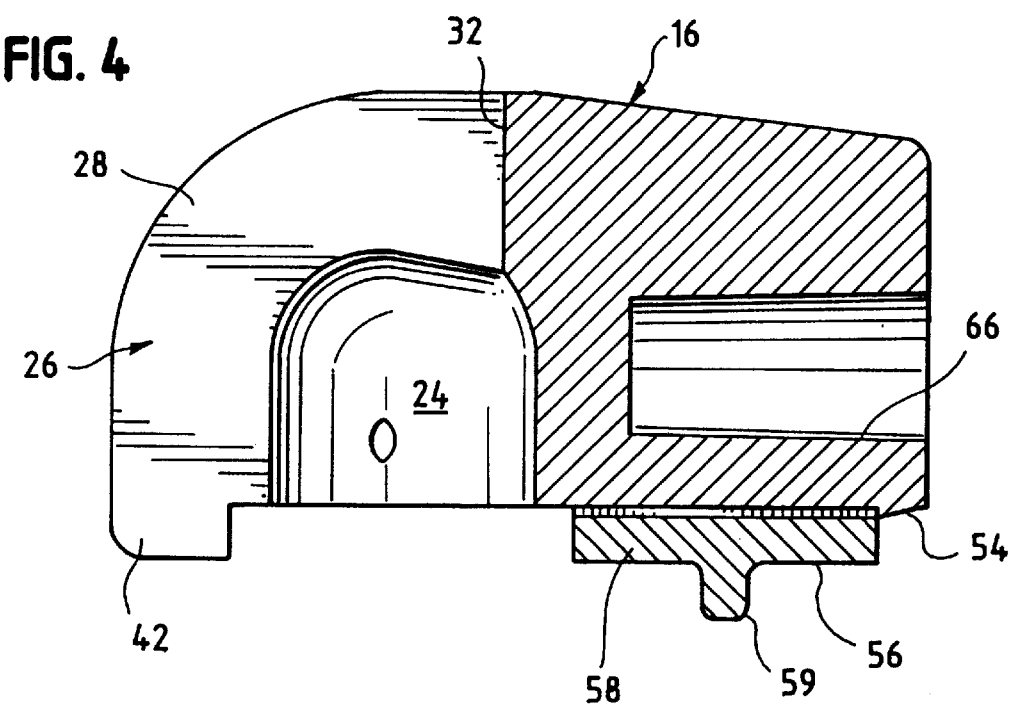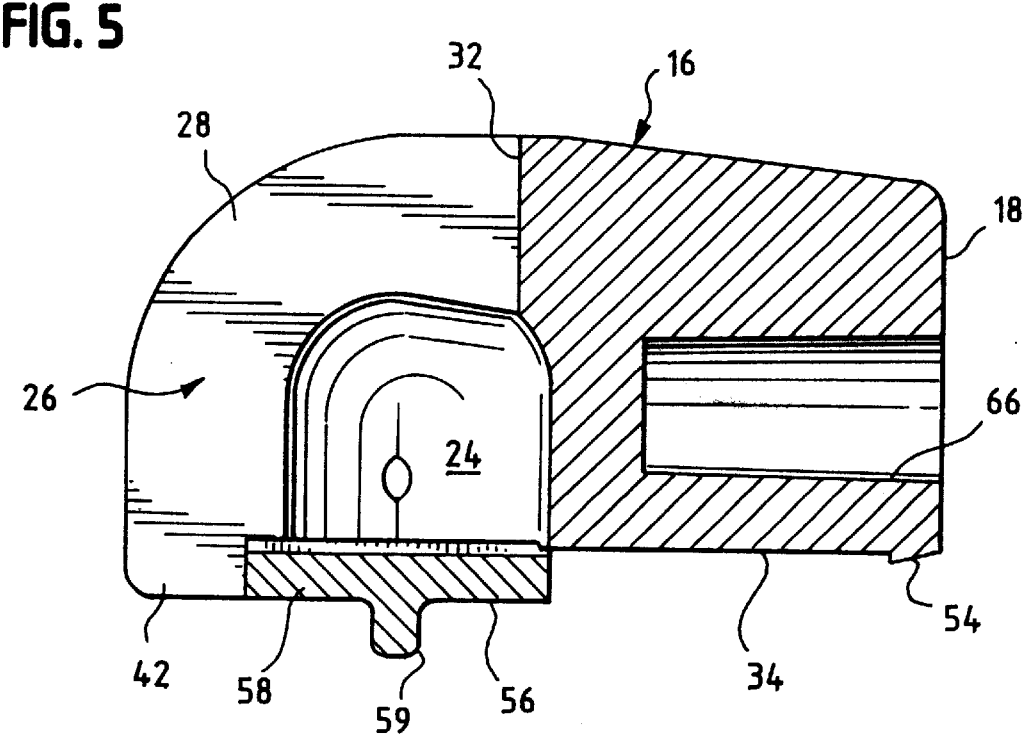

5,833,383

BALL SOCKET CONNECTOR

CROSS REFERENCE TO RELATED APPLICATIONS (Not Applicable)

STATEMENT REGARDING FEDERALLY SPONSORED RESEARCH OR DEVELOPMENT (Not Applicable)

BACKGROUND OF THE INVENTION

The present invention relates to connectors that are adapted to interconnect relatively movable members with relatively stationary members. More specifically, the present invention relates to a ball socket connector that is particularly adapted to connect the distal end of a gas spring shaft with the body of an automotive vehicle.

The manufacture of components used in automotive vehicles presents unique and difficult challenges. Not only must the component be manufactured by mass production techniques to exacting, ever more demanding standards, but the cost of manufacture must be minimized. For years, the automotive industry has continually "pressured" component manufacturers to reduce costs further. The difference of fractions of a cent in the manufacturing cost is at times of critical importance to the acceptance of a component by an automotive manufacturer.

Additionally, the ease and thus the cost of installing a component in automotive vehicles is of utmost importance to having a component selected for a vehicle. Again, the automotive industry has for years insisted that acceptable components be adapted for facile installation and to the extent possible, that component installation require a minimal number of steps or activities by installers who are highly paid production workers. Another long standing goal of the industry has been to reduce the total number of associated parts that must be used in connection with installing components.

In the past decades, the use of gas springs in automotive vehicles has increased. Gas springs are now commonly used to hold open vehicular trunk lids, deck lids, hoods, lift glass, hatch doors (in hatch type vehicles) and rear doors and lids (in minivans or sport utility type vehicles). Heretofore, an "L" shaped, 90° metal bracket was employed to connect a gas spring shaft with a vehicle. To facilitate the making of this connection at the vehicle assembly plant, the gas spring manufacturer was required to weld a blade to the distal end of the shaft and to connect the bracket to the welded blade by a rivet pin and bushing subassembly. (The other or cylinder end of the gas spring was connected to the vehicle by a conventional ball socket connection, and the gas spring manufacturer was also required to connect a ball socket connector body to the gas spring's other end.)

At the vehicle assembly plant, the conventional installation of the gas spring on a vehicle required a number of steps performed by a skilled installer. Specifically, the installer had to: obtain two bolts and washers for attaching the bracket, which as noted, was pre-assembled to the gas spring shaft; get the gas spring to be installed; get an air wrench with the correct bit; orient the bracket properly with respect to the vehicle; bolt the bracket to the vehicle while maintaining the bracket's proper orientation; change the wrench bit; drive the ball stud of the ball socket connector (which, as noted, is used to connect the gas spring's other or cylinder end) into the vehicle; put down the wrench; and snap the ball connector body onto the ball stud.

In terms of the added costs for gas spring manufacturers, the use of this heretofore conventional gas spring connection required several additional manufacturing steps, namely: manufacturing the bracket, making the blade-to-shaft weld; assembling the bushing onto the blade; and riveting the rivet pin to the bracket. Further, gas spring manufacturers had to use a relatively inefficient paint process and had to include the cost of the blade, the bracket, and the rivet/bushing subassembly in the overall materials cost for the gas spring.

As might be expected, gas spring manufacturers, as well as those in the automotive industry, have long sought a better, less costly and more efficient method of connecting gas springs to automotive vehicles.

BRIEF SUMMARY OF THE INVENTION

In principal aspects, the improved ball socket connector of my present invention is particularly useful for connecting a gas spring shaft with a vehicle in a more efficient, effective and less costly manner. Additionally, my improved ball socket connector may be relatively inexpensively manufactured, in comparison with the manufacturing cost of the connectors presently used for connecting gas spring shafts with vehicles.

By employing my improved ball socket connector, both the gas spring shaft and the other end of the gas spring may be connected to the vehicle by ball socket connectors. This significantly reduces costs on the part of the gas spring manufacturer. In other words, the use of my connector eliminates the costs of the blade, the metal bracket, and the bushing/rivet pin subassembly as well as the cost of welding the blade to the gas spring shaft, assembling the bushing with the blade, and riveting the blade to the bracket. Further, the gas spring manufacturer is able to use a much more efficient masking rack painting process for the gas spring.

Installation of the gas spring in vehicles at the vehicular assembly plant using my improved connector also requires fewer steps than those required for conventional connectors. The installer need only to obtain two ball studs, the gas spring and an air wrench with a standardized bit. The installer then screws in the first ball stud, screws in the second ball studs, snaps on one connector on the first ball stud and snaps on the other connector on the second ball stud.

Aside from reducing manufacturing and installation costs, my improved ball socket connector affords an additional, significant advantage. The connector of my invention provides four degrees of freedom of motion so that it is possible for the connector to affect a conical displacement between the gas spring and the vehicle. This four degrees of motion enables my connector to better accommodate, as compared to conventional connector bracket, the varying geometries, between the gas spring and the vehicle, presented during lid, hood, lift glass, door, gate openings and closings.

Accordingly, it is a primary object to the present invention to provided an improved connector for connecting a relatively movable member with a relatively stationary member. A related object of the present invention is to provide a improved ball socket connector of the type described, where the movable member has a central axis; where the movable member may extend, retract and rotate about its central axis and where during such extensions, retractions and rotations, the angular orientation of the movable member may change with respect to the stationary member.

Another object of the present invention is to provide an improved ball socket connection of the type described where the improved connector includes a ball stud having a longitudinal axis; where the ball stud includes first end that terminates in a ball having at least a partial spherical surface thereon, a second end, and a neck which extends between the second end and the ball; where the neck of the stud has a first preselected dimension, in a plane transverse to the longitudinal axis of the ball stud; where the ball of the ball stud has a second preselected dimension, in a plane transverse to the longitudinal axis of the ball stud, that is greater than the first preselected dimension; where the ball socket connector also includes a connector body that has a first end and a second end; where the connector body further includes an internal cavity of a preselected size such that the ball of the ball stud may be received within the internal cavity and so that when the ball is so received, relative rotational or pivotal movement may occur between the ball and the connector body; where the connector body includes a novel open slot that permits access to the internal cavity from without the connector body and that is defined by sides, which are spaced apart a preselected width, and by ends, which are spaced apart a preselected distance; where the width of the slot is less than the preselected dimension of the ball of the ball stud and greater than the preselected dimension of the neck of the ball stud so that the neck can project through the slot and so that relative movement may occur between the ball stud and the connector body between the slot's sides and between the slot's ends while the ball is unable to pass through the slot; where the length of the open slot is such that relative movement between the ball stud and the connector body can occur through a first arc that is greater than 20°; where relative side-to-side movement between the ball stud and the connector body can occur through a second arc; and where the ball connector body also includes a member that selectively retains the ball of the ball stud within the internal cavity. A related object of the present invention is to provide an improved ball socket connector of the type described where the retaining member is selectively movable between a first, closed position in which the member retains the ball in the internal cavity and a second, closed position which permits the ball to be removed from the internal cavity; where the member is a plate that is slidable on and with respect to the connector body between the open and closed positions; and where the connector body further includes means for holding the slidable plate in its closed position.

Still another object of the present invention is to provide an improved ball socket connector of the type described where the stationary member is a vehicle, where the movable member is a gas spring shaft; and where when the connected to the vehicle by the use of the improved ball socket connector, the gas spring may be used to hold open vehicular trunk lids, deck lids, hoods, lift glass, hatch doors (in hatch type vehicles) and rear doors or gates (in minivans or sport utility type vehicles).

Yet another object of the present invention is to provide an improved ball socket connector of the type described where the connector body's axis is co-axial with the central axis of the gas spring shaft; where the first arc is an angle of at least 100° and is disposed in a plane substantially parallel with the axis of the connector body; and where the plane of the second arc is substantially transverse to the connector body's axis.

These and other objects, advantages and benefits of my improved ball socket connector will become apparent from the following description of the preferred embodiment of my invention, made in conjunction with the following drawings

BRIEF DESCRIPTION OF THE SEVERAL VIEWS OF THE DRAWINGS

FIG. 1 is a perspective view of the preferred embodiment of my ball socket connector invention;

FIG. 2 is a perspective view of the body of the ball socket connector of FIG. 1;

FIG. 3 is a side elevational view of the ball stud of the ball socket connector of FIG. 1;

FIG. 4 is a longitudinal, axial cross-sectional view of the connector body of FIG. 2, with the slidable member shown in its open position; and FIG. 5 is a cross-sectional view, similar to that of FIG. 4, with the slidable member shown in its closed position.

DETAILED DESCRIPTION OF THE INVENTION

The preferred embodiment of my improved ball socket connector is shown generally at 10 in the FIGURES. The connector 12 is adapted to connect a relatively movable member to a relatively stationary member, especially where the movable member may move through four degrees of freedom of motion with respect to the stationary member. As previously noted, the connector 10 is particularly adapted to interconnect a gas spring shaft to a vehicle, and the preferred embodiment of the connector 12 will be described with reference to a gas spring. The gas spring may be of conventional design and construction. Such a gas spring is shown diagrammatically at 12 in FIG. 1 and may be used to support and hold up vehicular lids, trunk lids, hoods, lift glass, hatch doors (in hatch type vehicles) and rear doors or gates (in minivans or sport utility type vehicles).

As is known by those working in the art, gas spring shafts have the inherent ability to rotate freely, during shaft extension and compression, in relation to the gas spring body. The novel design of the connector 10 intentionally exploits this motion potential to augment the connector's ability to accommodate the varying geometries presented during, for example, hatch opening and closing.

Referring now to FIGS. 1–3, the ball socket connector 10 includes a ball stud 14, which is best shown in FIG. 2, and an elongated body 16, which may be molded from glass filled nylon or other, similar plastic materials or which may be die casted from zinc/aluminum or similar materials. The body 16 has a first end 18, a second end 22 and a central, longitudinal axis which extends between the ends 18 and 22.

An internal cavity 24 is molded in the body 16 adjacent the second end 22. The walls defining the cavity 24 have a generally semi-spherical shape or configuration. As hereinafter discussed, the cavity is designed and intended to receive and snugly hold a spherically shaped ball.

An open slot 26 is also formed in the end 22 of the body so as to permits communication between the interior of the cavity 24 and the exterior of the body. The plane of the longitudinal centerline of the slot 26 is co-axial with the longitudinal axis of the body 16. More specifically, the slot 26 is defined by side walls 28 and an end wall 32. The other end of the slot is open. The side walls 28 are substantially parallel to each other and are spaced apart a preselected width. Similarly the length of the slot 26, as measured between its ends (i.e., between the wall 32 and the open end), is greater than that of the slot's width between the side walls 28. The major diametrical dimension of the internal cavity 24 is also greater than the width of the slot 26, again as measured between its side walls 28.

The body 16 includes a relatively flat side surface 34 that lies in a plane parallel to the central longitudinal axis of the body, and as illustrated in FIG. 2, "faces" generally "upwardly". This side surface 34 extends from the end 18 to adjacent to the other end 22 of the body. The internal cavity 24 opens into the surface 34 near the end 22 so as to define a ball introduction/removal opening 36 for the internal cavity.

A pair of shoulders 38 and 42 flank each side of the open end of the slot 26 and define the end of the surface 34 adjacent to the end 22. The outer ends (the "upper" ends as illustrated in FIG. 2) of these shoulders 38 and 42 define the other open end of the slot 26, as best shown in FIG. 2.

A pair of longitudinal extending grooves 44 and 46 are formed in the body 16 adjacent to the side edges 48 and 52 of the surface 34. These grooves 44 and 46 are disposed "below" (as illustrated in FIG. 2) the plane of the surface 34 and extend substantially from one end 18 to the shoulders 38 and 42 at the other end 22. The longitudinal axes of the grooves are generally parallel to each other and to the central longitudinal axis of the body.

A ramp 54 is formed on the surface 34 adjacent to the end 18 of the body and mid-way between the sides 48 and 52. The inclined, sloping portion of the ramp 54 faces the end 18. Like the shoulders 38 and 42, the ramp 54 extends "upwardly" from the plane of the surface 34, as best shown in FIGS. 2, 4 and 5.

Sidewardly extending detents/protents 55, as best illustrated in FIGS. 1 and 2, are molded into the grooves 44 and 46 and extend outwardly, from the "bottom" surfaces of the grooves, a short distance from the planes of the bottom surfaces. The detents/protents 55 are located approximately mid-way between the side edges of the grooves and approximately one half to two thirds of the distance from the end 18 toward the shoulders 38 and 42.

A ball retainer plate 56 is mounted on the body 16 adjacent the surface 34. The plate 56 may be molded from the same plastic material as the body 16. The plate 56 includes a central member 58 that has a length which is slightly greater than or equal to the width of the surface 34, as measured between the side edges 48 and 52, and that has a central, lengthwise, raised reinforcing, thumb push installation rib 59. The width of the member 58 (in the direction parallel to the longitudinal axis of the body 16) is approximately between one third and one half of the length of the surface 34, as measured from the shoulders 38 and 42 to the end 18, and is selected so that its width is greater than the diameter of the opening 36. Integral, generally L-shaped projections 60 extend, in the same direction, perpendicularly from each end of the member 58. The distal ends 62 of the projections 60 face and extend toward each other so that they underlie the ends of the member 58. The ends 62 are disposed in a plane that is generally parallel to the central axis of the body 16.

When the plate 56 is mounted on the body 16 (as shown in FIGS. 1, 2, 4 and 5), the ends 62 project into the grooves 44 and 46. The interfitting of the ends 62 in these grooves serves to retain the plate 56 on the body 16, next to the surface 34, so that the member 58 overlies a portion of the surface. The plate 56 can, moreover, be slid along the surface 34 by application of appropriately directed manual force to member 58. The "upwardly" (as viewed in FIG. 2) projecting rib 59 facilitates the application of sliding force to the plate 56.

Contact between the plate 56 and the shoulders 38 and 42 will prevent the plate 56 from being slidably pushed off the surface 34 at the end 22. Similarly, the ramp 54 is intended to and does normally prevent the plate 56 from being slidably pushed off the end 18 of the body 16. The inclined portion of the ramp 54 will, however, permit the plate 56 to pass over the abutment during the initial connector assembly.

The end 18 of the body 16 includes an internally threaded, central cavity 66 that has a central axis aligned with the central longitudinal axis of the body 16 so that the axis of the end 68 and the body 16 are co-axial. The cavity 66 is designed and adapted to receive the threaded, distal end 68 of the shaft 68 or the end cap of the gas spring 14. The threaded connection between the cavity 66 and the shaft end 68 securely holds the body 16 on the gas spring 14.

As noted, the ball socket connector 10 also includes a ball stud 12 that is best shown in FIG. 3. The ball stud has a central, longitudinal axis and includes a first end 74 that has a partially spherical shaped ball 76 thereon. The other end 78 of the ball stud is externally threaded and is designed and adapted to be fastened to (screw into) a vehicle in a conventional manner by, for example, a conventional air driven tool. A neck portion 82 extends between the ball 76 and the end 78. A transverse shoulder 84, adjacent to the end 78, may be shaped to cooperate with the tool used to drive or screw the ball stud into the vehicle.

The maximum diametrical dimension of the ball 76 (as shown by the plane which is designated at 86 and which is transverse to the central longitudinal axis of the ball stud) is selected or preselected so that the ball may be introduced into and removed from the cavity 24 through the opening 36 and so that the ball is larger than the width of the slot 26 whereby the ball cannot be pulled out of the housing through the slot. Additionally, to avoid "rattling" noises, the diametrical dimension of the ball is selected so that there will be close, surface-to-surface contact between the spherical surface of the ball and the spherical surface of the cavity 24 when the ball is positioned within the cavity.

The transverse dimension of the neck 82, adjacent to the ball 76 (i.e., the dimension in a plane transversed to the central longitudinal axis of the ball stud) is selected so that the neck can project through the slot 26 without contacting or touching either side wall 28 and so that side-to-side relative movement between the ball stud 12 and the body 16, and between the side walls 28 may occur through a limited arc. The end-to-end length of the slot 26 is selected so that relative movement between the ball stud 12 and the body 16, along the slot, may occur through an arc of approximately 100°.

When the plate 56 is moved to a so called "open position" (viz., when it is adjacent to the end 18 of the body, as best shown in FIG. 4), the ball 76 of the ball stud 72 may be readily introduced into internal cavity 24 through the opening 36, so that its neck 82 projects out through the slot 26. When the plate 56 is moved to a so called "closed position" (viz., when it is adjacent to the other end 22 of the body so that the plate 56 abuts the shoulders 38 and 42, as best shown in FIG. 5), the plate 56 retains and prevents the ball 76 from being removed from the cavity 24. When the plate 56 is in its closed position, the side of the member 58, adjacent to the end 18, contacts the detents/protents 55. This contact serves to preclude unintended movement of the plate 56 away from the closed position while not unduly hindering movement of the plate 56 from its open position to its closed position upon the application of a positive force to the plate 56.

As will be appreciated by those skilled in the art, the body 16 and plate 56 may be relatively inexpensively manufactured by conventional molding techniques. Similarly, the ball stud 72 is of a conventional design and may be manufactured in a conventional, relatively inexpensive manner. The body 16 can be screwed onto the distal end 68 of the gas spring shaft by the gas spring manufacturer and shipped with the gas spring to the vehicular assembly plant. As noted above, to connect the gas spring shaft to the vehicle, the installer only has to fastened the ball stud 12 to the vehicle, snap the body 16 over the ball 76 (so that the ball is within the cavity 24), and then move the plate 56 to its closed position as shown in FIG. 5. If as is now conventional, the other end of the gas spring also employs a ball socket connector, that connector body may be identical to the body 16. The installation of the gas spring would be completed by having the installer screw another ball stud 12 to the vehicle and snap on the second connector body onto that stud. Hence the installation is greatly simplified as compared to now conventional methods of installing a gas spring on vehicles.

As also noted, one of the primary advantages of the connector 10 is that in use, it will permit four degrees of freedom of motion between the interconnected relatively stationary member and a relatively movable member, e.g., between an automotive vehicle and a gas spring shaft. Specifically, the connector body 16 may: rotate clockwise and counterclockwise with respect to the gas spring shaft; rotate clockwise and counterclockwise with respect to the ball stud 12; move through the length of the slot 26, e.g., through a 100° or greater arc, with respect to the ball stud; and move, with respect to the ball stud 12, from side to side within the slot 26. These degrees of motion freedom facilitate the raising and lowering of a lid, hood, lift glass, door, gate supported by the gas spring.

I claim:

1. An improved ball socket connector comprising:
   a ball stud including a first end, which has a ball with at least a partial spherical surface thereon; a second end, which is spaced from the first end; a longitudinal axis, which extends between the first and second ends; and a neck, which is disposed between the first and second ends and which has a first preselected dimension transverse to the longitudinal axis of the ball stud; the ball of the ball stud having a second preselected dimension, transverse to the longitudinal axis of the ball stud, that is greater than the first preselected dimension of the neck of the ball stud;
   a connector body including a first end; a second end; a longitudinal axis, which extends between the first and second ends of the connector body; and a first member; the connector body also including an internal cavity of a preselected size such that the ball of the ball stud may be received in the internal cavity and such that the connector body, when the ball of the ball stud is so received in the internal cavity, may be rotated, about the longitudinal axis of the ball stud, relative to the ball stud; the connector body further including an elongated, open slot that communicates with the internal cavity, that is defined by side portions, which are spaced apart a preselected width, that is further defined by end portions, which are spaced apart a preselected distance, and that has a longitudinal axis, which extends between the end portions; the width of the open slot being selected so that the width is less than the second preselected of the ball of the ball stud dimension and is greater than the first preselected dimension of the neck of the ball stud such that the neck of the ball stud can project through the open slot, such that the ball of the ball stud is unable to pass through of the open slot, and such that the relative movement may occur between the side portions of the slot of the connector body and the neck of the ball stud, transverse to the longitudinal axis of the slot; the length of the open slot, between the end portions, being selected such that the connector body may be selectively moved through an arc, relative to the ball stud, between a first position where the longitudinal axes of the connector body and the ball stud are substantially aligned and can remain substantially aligned during relative rotation of the connector body with respect to the ball stud, and a second position where the longitudinal axis of the connector body is disposed at an angle of approximately 100° with respect to the longitudinal axis of the ball stud; and with the first member selectively retaining the ball of the ball stud in the internal cavity.

2. The improved ball socket connector of claim 1 wherein the ball socket connector is adapted to be connected between a relatively stationary member and a relatively movable member; wherein the movable member has a central axis; wherein the relatively movable member may extend, may retract and may rotate about the central axis; wherein during such extensions, retractions and rotations, the relatively movable member may move with respect to the stationary member; wherein first end of the connector body is adapted to be connected with selectively one of the relatively movable member or the relatively stationary member; wherein the second end of the ball stud is adapted to be connected with selectively the other of the relatively movable member and the relatively stationary member; and wherein the arc includes an angle of at least 100°.

3. The improved ball socket connector of claim 2 wherein the first member is selectively movable between a ball closed position in which the first member retains the ball of the ball stud in the internal cavity and a ball open position, which permits the ball of the ball stud to be introduced into and removed from the internal cavity.

4. The improved ball socket connector of claim 3 wherein the first member is a plate that is selectively slidable on and with respect to the connector body between the ball closed and ball open positions; wherein the plate is mounted on the connector body at a location remote from the open slot; and wherein the plate is selectively held on the connector body in its ball closed position.

5. The improved ball socket connector of claim 2 wherein the plane of the arc is substantially parallel with the longitudinal axis of the connector body and with the plane of the longitudinal axis of the open slot of the connector body.

6. The improved ball socket connector of claim 5 wherein the arc includes an angle of at least 100°, and wherein the connector body and the first member are made of plastic.

7. The improved ball socket connector of claim 2 wherein the longitudinal axis of the connector body is co-axial with the longitudinal axis of the ball stud when the connector body is in the first position.

8. The improved ball socket connector of claim 7 wherein the first member is selectively movable between a ball closed position in which the first member retains the ball of the ball socket in the internal cavity and a ball open position which permits the ball of the ball stud to be introduced into or removed from the internal cavity.

9. The improved ball socket connector of claim 8 wherein the first member is a plate that is selectively slidable on and with respect to the connector body between the ball close and ball open positions; and wherein the plate is selectively held on the connector body in its ball close position.

10. The improved ball socket connector of claim 9 wherein the arc includes an angle of at least 100°; and wherein the connector body and the plate are made of plastic.

11. The improved ball socket of claim 2 wherein the relatively stationary member is a vehicle; wherein the relatively movable member is a gas spring having a movable shaft; wherein the central axis of the relatively movable member is the longitudinal axis of the gas spring shaft; and wherein the gas spring may be used to hold open vehicular trunk lids, deck lids, hoods, lift glass, hatch doors and rear doors or gates.

12. An improved ball socket connector adapted to be connected between an end of a movable shaft of a gas spring and selectively one of a relatively stationary part of a motor vehicle or a relative movable part of the motor vehicle, the improved ball socket connector comprising:

a ball stud including a first end, which has a ball with at least a partial spherical surface thereon; a second end, which is spaced from the first end and which is adapted to be fastened to selectively one of the relatively stationary part of the motor vehicle and the relatively movable part of the motor vehicle; a longitudinal axis, which extends between the first and second ends; and a neck, which is disposed between the first and second ends and which has a first preselected dimension transverse to the longitudinal axis of the ball stud; the ball of the ball stud having a second preselected dimension, transverse to the longitudinal axis of the ball stud, that is greater than the first preselected dimension of the neck of the ball stud;

a connector body including a first end, which is adapted to be connected and move with the gas spring shaft end; a second end; a longitudinal axis, which extends between the first and second ends of the connector body; and a first member; the connector body also including an internal cavity of a preselected size such that the ball of the ball stud may be received in the internal cavity and such that the connector body, when the ball of the ball stud is so received in the internal cavity, may be rotated, about the longitudinal axis of the ball stud, relative to the ball stud; the connector body further including an elongated, open slot that communicates with the internal cavity, that is defined by side portions, which are spaced apart a preselected width, that is further defined by end portions, which are spaced apart a preselected distance, and that has a longitudinal axis, which extends between the end portions; the width of the open slot being selected so that the width is less than the second preselected dimension of the ball of the ball stud and is greater than the first preselected dimension of the neck of the ball stud such that the neck of the ball stud can project through the open slot, such that the ball of the ball stud is unable to pass through of the open slot, and such that relative movement may occur between the side portions of the slot of the connector body and the neck of the ball stud transverse to the longitudinal axis of the slot; the length of the open slot, between the end portions, being selected such that the connector body may be selectively moved through an arc, relative to the ball stud, between a first position where the longitudinal axes of the connector body and the ball stud are substantially aligned and can remain substantially aligned during relative rotation of the connector body with respect to the ball stud, and a second position where the longitudinal axis of the connector body is disposed at an angle of approximately 100° with respect to the longitudinal axis of the ball stud; and the first member selectively retaining the ball of the ball stud in the internal cavity.

13. The improved ball socket connector of claim 12 wherein the gas spring shaft that may extend, may retract and may rotate about a central axis; wherein the first end of the connector body is adapted to be connected with the movable shaft of the gas spring; wherein the gas spring is adapted to be used to hold open selectively one of a vehicular trunk lid, deck lid, hood, lift glass, hatch door and rear door; and wherein the arc includes an angle of at least 100°.

14. The improved ball socket connector of claim 13 wherein the longitudinal axis of the connector body is co-axial with the longitudinal axis of the gas spring shaft.

15. The improved ball socket connector of claim 14 wherein the plane of the arc is substantially parallel with the longitudinal axis of the connector body; and wherein the connector body and the gas spring shaft may move, including rotate, together.

16. The improved ball socket connector of claim 15 wherein the arc includes an angle of at least 100°.

17. The improved ball socket connector of claim 16 wherein the first member is selectively movable between a ball closed position in which the first member retains the ball of the ball stud in the internal cavity and a ball open position which permits the ball of the ball stud to be introduced into or removed from the internal cavity.

18. The improved ball socket connector of claim 17 wherein the first member is a plate that is selectively slidable on and with respect to the connector body between the ball closed and ball open positions; and wherein the plate is selectively held on the connector body in its ball closed position.

19. The improved ball connector of claim 18 wherein the plate is mounted on the connector body at a location spaced from the open slot; and wherein the connector body and the plate are made of plastic.

* * * * *